(12) United States Patent
Singer

(10) Patent No.: US 9,707,935 B1
(45) Date of Patent: Jul. 18, 2017

(54) WINDSHIELD TOUCH AND CLEAN SYSTEM

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 17 days.

(21) Appl. No.: 15/199,659

(22) Filed: Jun. 30, 2016

(51) Int. Cl.
*B60S 1/48* (2006.01)
*B60S 1/34* (2006.01)
*B60S 1/38* (2006.01)

(52) U.S. Cl.
CPC ............. *B60S 1/481* (2013.01); *B60S 1/3409* (2013.01); *B60S 2001/3831* (2013.01); *B60S 2001/3834* (2013.01)

(58) Field of Classification Search
CPC ...... B60S 2001/3834; B60S 2001/3831; B60S 1/3409
USPC ......... 15/250.21, 250, 351, 250.352, 250.24, 15/250.04
See application file for complete search history.

(56) References Cited

U.S. PATENT DOCUMENTS

| | | | | |
|---|---|---|---|---|
| 1,859,641 | A * | 5/1932 | Weaver | B60S 1/3404 15/250.19 |
| 4,945,601 | A * | 8/1990 | Bilodeau | B60S 1/0452 15/250.19 |
| 5,502,865 | A * | 4/1996 | Zhou | B60S 1/185 15/250.16 |
| 8,381,348 | B2 * | 2/2013 | Egner-Walter | B60S 1/381 15/250.04 |
| 2006/0059648 | A1 * | 3/2006 | Meredith | B60S 1/38 15/250.41 |
| 2008/0034531 | A1 * | 2/2008 | Beaver | B60S 1/0477 15/250.361 |
| 2009/0100627 | A1 * | 4/2009 | Renke | B60S 1/0477 15/250.21 |

* cited by examiner

*Primary Examiner* — Andrew A Horton
(74) *Attorney, Agent, or Firm* — Stetina Brunda Garred & Brucker

(57) ABSTRACT

A windshield touch and clean system that can clean either the entire windshield of an automobile or spot clean a localized area of the windshield is disclosed. The windshield touch and clean system may control a cleaning head in a number of ways including but not limited to two articulating extension members or a gantry system. The cleaning head may be retrofitted with a spray nozzle for spraying cleaning fluid and also a vibration unit to assist in cleaning of residue on the windshield.

15 Claims, 14 Drawing Sheets

WINDSHIELD TOUCH AND CLEAN SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and features described herein relate to a windshield touch and clean system of an automobile which includes at least passenger vehicles, trucks and motor homes.

Windshield washers of automobiles have been around for very long time. They generally consists of a wiper blade that rotates left and right in a reciprocal fashion to both clean and wipe dry the windshield of the automobile.

Accordingly, there is a need in the art for improved windshield washer for automobiles.

BRIEF SUMMARY

Two embodiments of a windshield touch and clean system are disclosed herein. The windshield touch and clean system has a cleaning head that can reach the entire surface area of the windshield to clean the entire windshield or may be operated to spot clean a localized area of the windshield, as needed. The cleaning head of the windshield touch and clean system may be operated with two extension members rotatable about articulating joints or a gantry system wherein a horizontal member rides within tracks up and down the windshield and the cleaning head moves left and right on the horizontal member.

More particularly, an automobile having a windshield touch and clean system is disclosed. The automobile may comprise a plurality of wheels; an engine connected to the plurality of wheels for propelling the automobile forward; a steering wheel connected to at least one of the at least two wheels for guiding a direction of the automobile; a windshield for protecting a driver of the automobile from projectiles; and the windshield touch and clean system.

The windshield touch and clean system may be positioned outside of the automobile below the windshield. The windshield touch and clean system may have a cleaning head for washing dirt off of the windshield. The head may be connected to the automobile with first and second extension members connected to each other with an articulating joint so that the head may be positioned at a location within a primary field of view of the windshield. The first extension member may be connected to the head. The second extension member may be pivotally connected to the first extension member. The second extension member may be pivotally connected to the automobile.

The head of the windshield touch and clean system may have a brush.

The head of the windshield touch and clean system may have a vibration unit for vibrating the head while cleaning dirt off of the windshield.

The head or the first extension member of the windshield touch and clean system may have a spray nozzle for spraying cleaning fluid on the windshield.

The windshield touch and clean system of the automobile may further have a computer mounted to the automobile for controlling the head.

The windshield touch and clean system of the automobile may further have a motor for controlling the first and second extension members and the position of the head on the windshield.

The windshield touch and clean system of the automobile may further comprise a tube for routing cleaning fluid toward the cleaning head and being fluidically connected to a spray nozzle disposed on or adjacent to the cleaning head.

The automobile may further comprise a touch screen displaying a visual depiction of the windshield and the touch screen being connected to a computer which controls positioning of the head.

In another aspect, a method of cleaning a dirty spot on a windshield of an automobile is disclosed. The method may comprise the steps of receiving a location to be cleaned from a touch screen; activating a motor to traverse a cleaning head to a corresponding location on the windshield of the automobile and traverse back and forth over the corresponding location on the windshield of the automobile; and activating a pump to spray cleaning fluid out of a spray nozzle onto the corresponding location on the windshield of the automobile;

The method may further comprise the step of activating a vibration unit attached to the cleaning head.

The method may further comprise the step of rotating brushes of the cleaning head to clean the corresponding location on the windshield of the automobile.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
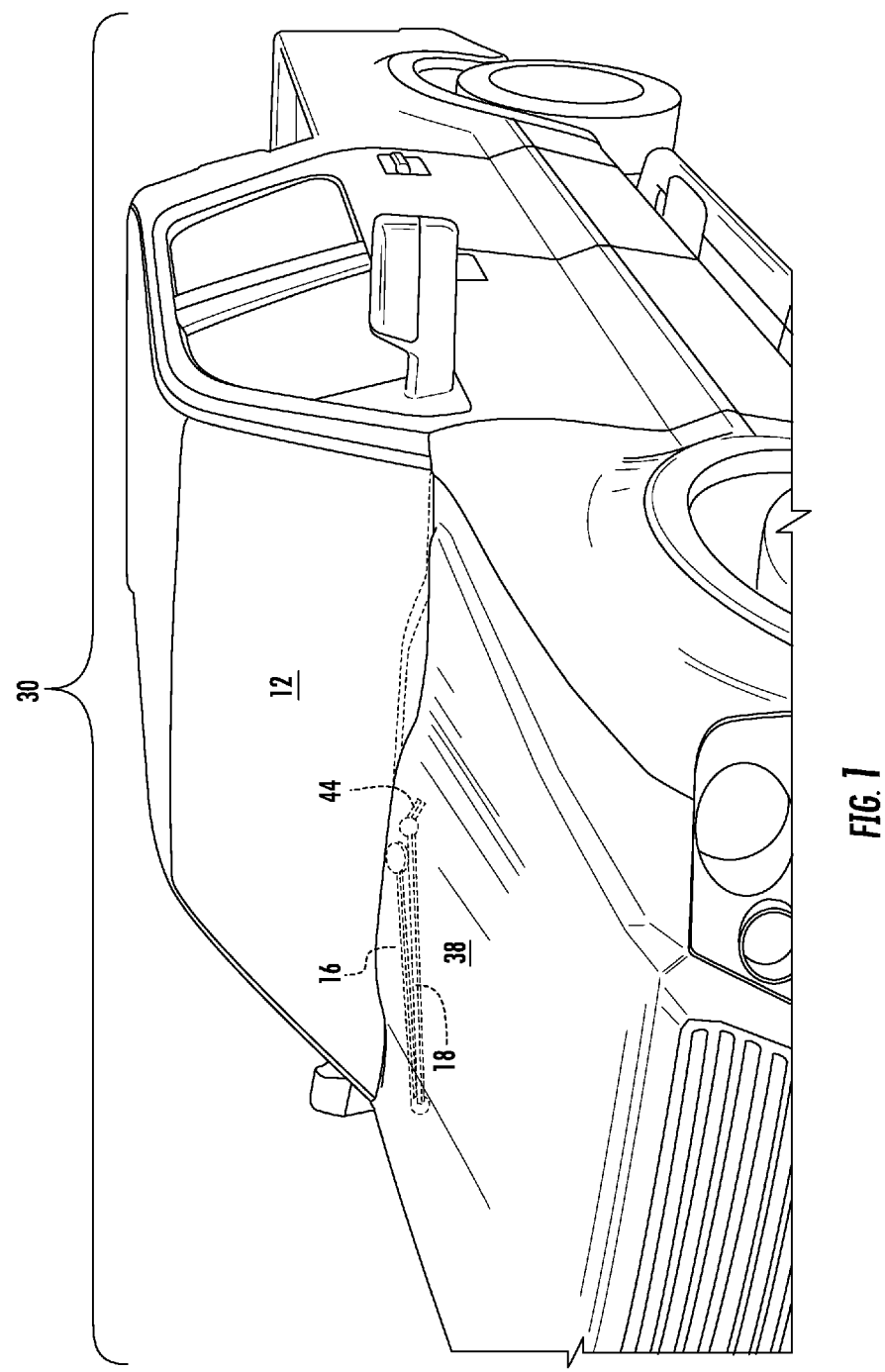
FIG. 1 is a perspective view of an automobile having a windshield touch and clean system depicting a first embodiment.
Figure 2:
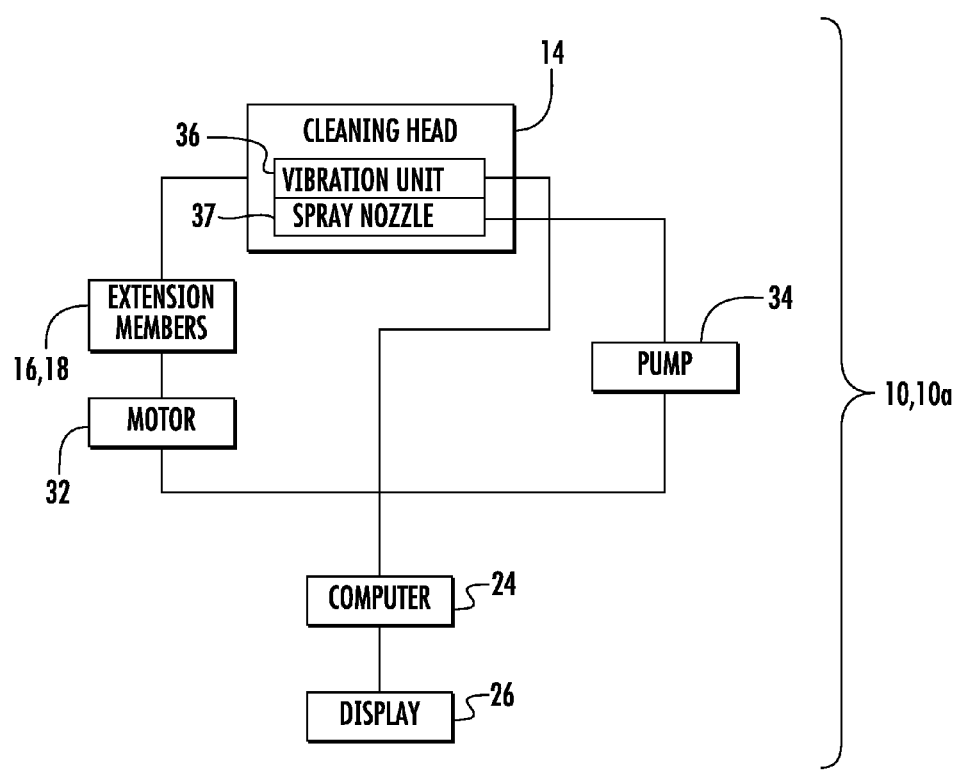
FIG. 2 is a schematic view the windshield touch and clean system of the first and a second embodiment.

Referring now to the drawings, a windshield touch and clean system 10 for spot cleaning a windshield 12 of an automobile 30 is shown. The windshield touch and clean system 10 includes a cleaning head 14 that can be traversed to any location on the windshield 12 by way of extension members 16, 18 that are pivotally attached to each other by articulating joints 20, 22. The cleaning head 14 may be controlled by a computer 24 which receives user input by way of a display 26 located in a passenger cabin of the automobile 30. A driver may touch the display 26 about where the windshield 12 is dirty. The computer 24 receives information from the display 26 which controls a motor 32 to actuate the cleaning head 14 to the location indicated by the driver on the display. A pump 34 sprays cleaning fluid on the dirt to help break down the dirt so that the dirt can be removed from the windshield 12. The motor 32 moves the cleaning head 14 over the dirt and an optional vibration unit 36 can further be activated to help remove the dirt from the windshield 12.

Figure 12:
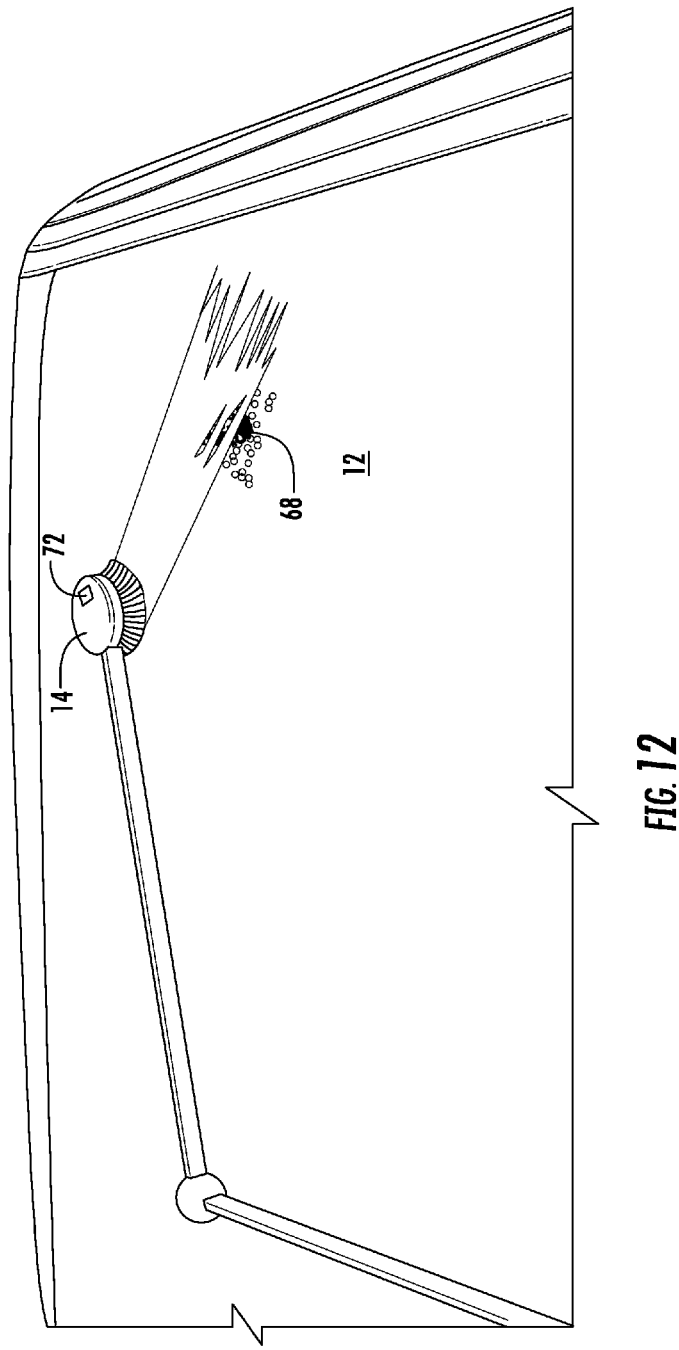
FIG. 12 illustrates the cleaning head wiping the residue off of the windshield.
Figure 13:
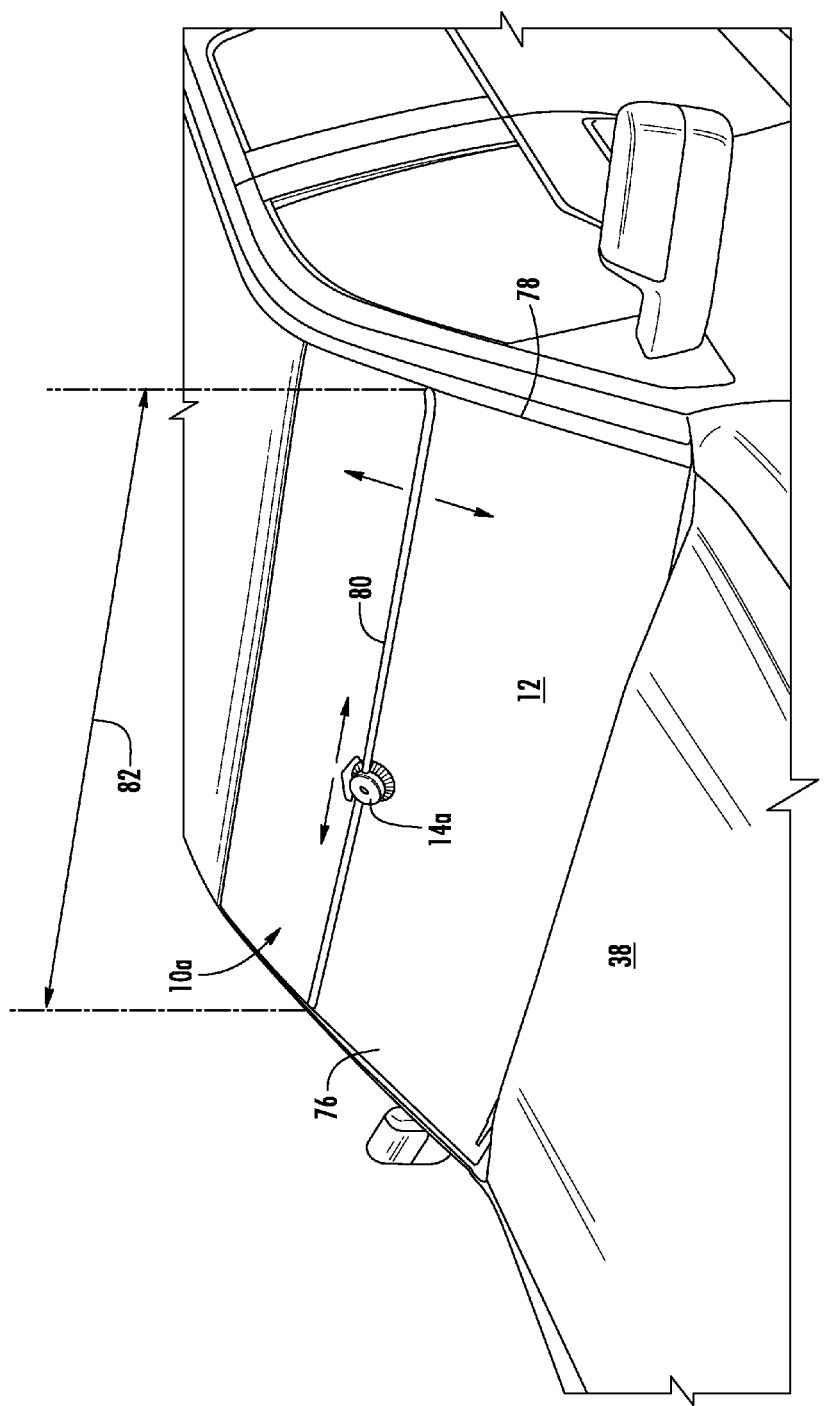
FIG. 13 illustrates the second embodiment of the windshield touch and clean system.

Referring now to the drawings, the automobile 30 may have the windshield touch and clean system 10 shown in FIGS. 1-11 or the windshield touch and clean system 10a shown in FIGS. 12-13 or combinations thereof implemented in the automobile 30 as shown in the figures. The automobile 30 shown in the figures is that of a pickup truck. However, other automobiles including but not limited to sedans, sports cars, large-format trucks, etc. may incorporate the windshield touch and clean systems 10, 10a described therein.

The windshield touch and clean system 10 is hidden under a hood 38 of the automobile when the windshield touch and clean system 10 is not in use, as shown in FIG. 1. The windshield touch and clean system 10 includes the cleaning head 14, extension members 16, 18, motor 32 which drives the extension members 16, 18, the pump 34, the computer 24 and the display 26.

Figure 3:
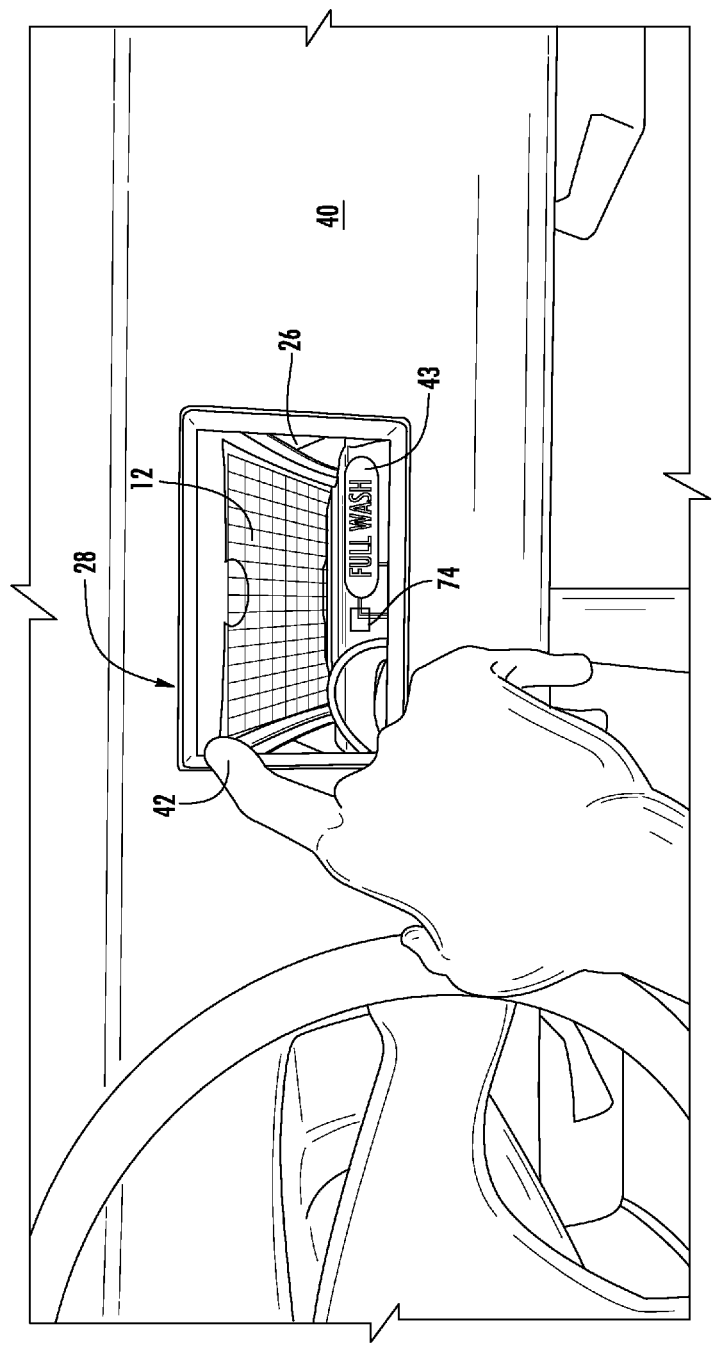
FIG. 3 is an illustration of a display of the windshield touch and clean system.

To deploy the window washing system 10, the user may activate the system from the display 26 shown in FIG. 3. The display 26 may be mounted to a dashboard 40 within a cabin 28 of the automobile 30. However, it is also contemplated that the display 26 may be mounted to other areas of the passenger cabin such as the center console or driver-side armrest. The dashboard 26 may be located centrally on the dashboard 40 so that the user or driver can easily access and manipulate the display 26. The display 26 may be a touch sensitive screen as shown in FIG. 3 but may also be a mouse driven display. If the display 26 is a mouse driven display, then the automobile 30 may have a joystick located on the dashboard, center console or other area that the driver can manipulate so that a cursor on the display 26 may be traversed to a proper location. An icon displayed on the display 26, may be selected by depressing a button on the joystick or other area near the joystick. A spot on the display 26 depicting the windshield 12 may also be selected by traversing the cursor shown on the display 26 with the joystick and depressing the button. Nevertheless, the preferred embodiments show the display 26 as a touch sensitive screen. The user can touch the screen with his or her finger 42 in order to select the icon displayed on the display 26.

The display 26 illustrates the front windshield 12 of the automobile 30. Moreover, the display 26 also shows an option for a full wash 43. By depressing an area on the display 26 illustrated by the windshield 12 with the finger 42, the windshield touch and clean system 10 may be deployed and clean only a spot area or localized area on the windshield 12 as indicated by the area depressed by the finger 42 of the driver or user. Alternatively, if a full wash of the windshield 12 is desired, then the user may depress the full wash icon 43 on the display 26. Depending on whether the user depresses a localized area on the display 26 depicting the windshield 12 or the full wash icon 43, the windshield touch and clean system 10 may be deployed to wash the localized area or the entire viewing area of the front windshield.

Figure 4:
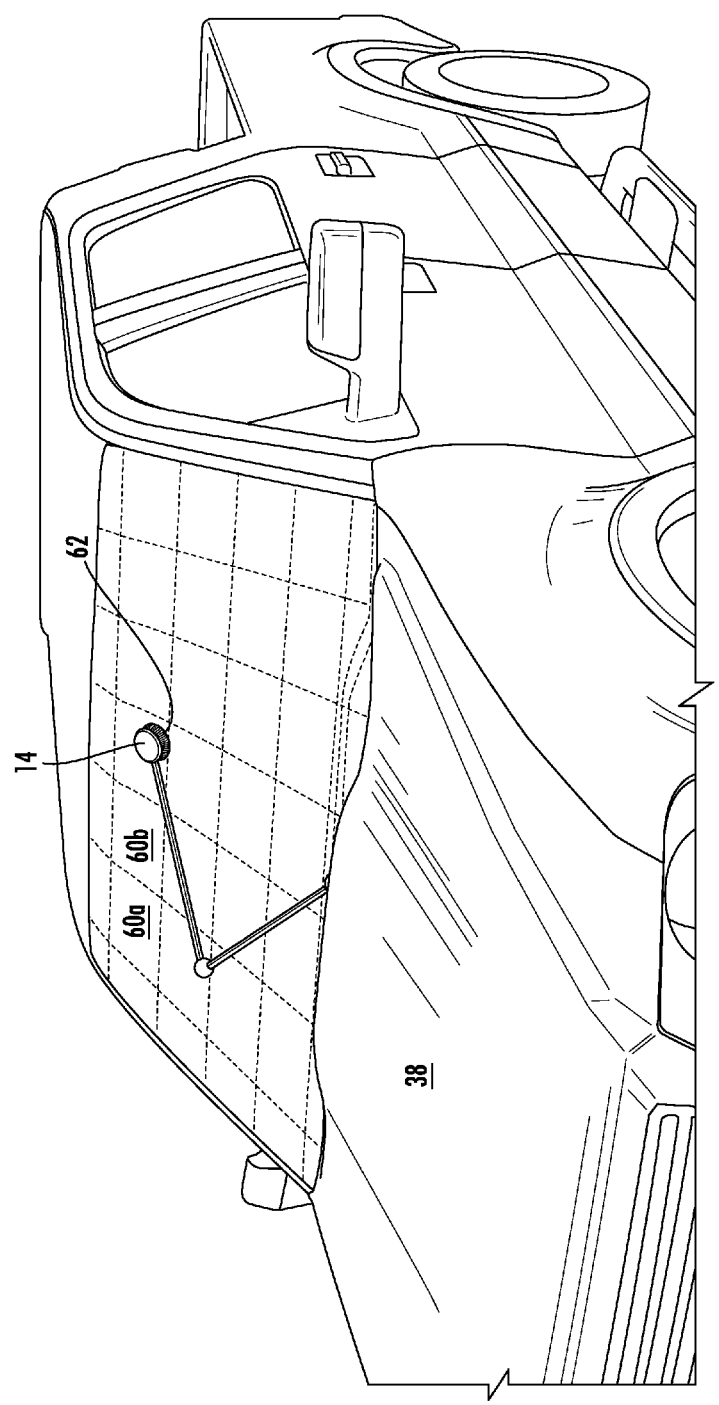
FIG. 4 is an illustration of the first embodiment of the windshield touch and clean system in a deployed configuration.
Figure 5:
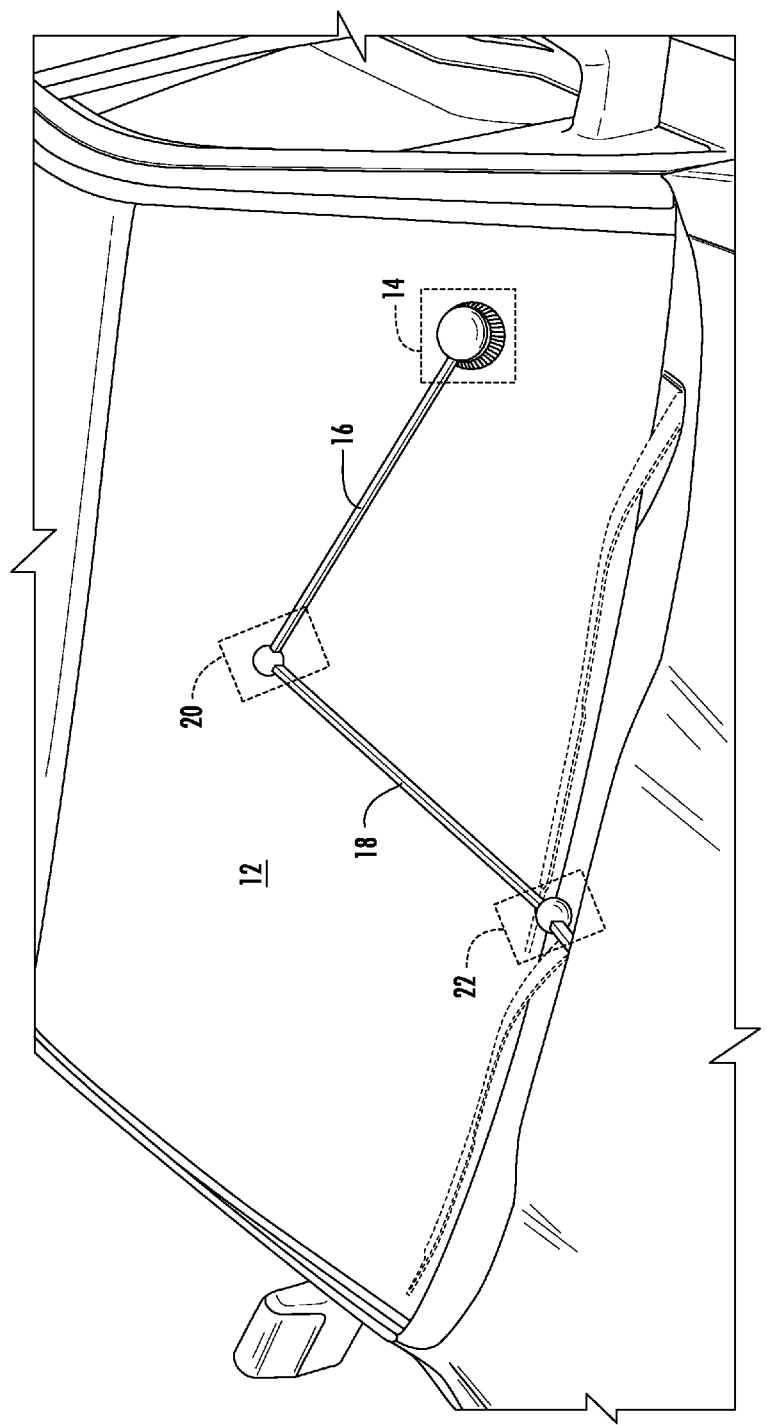
FIG. 5 is an illustration of the first embodiment of the windshield touch and clean system in the deployed configuration with a cleaning head in a different position compared to that shown in FIG. 4.
Figure 6:
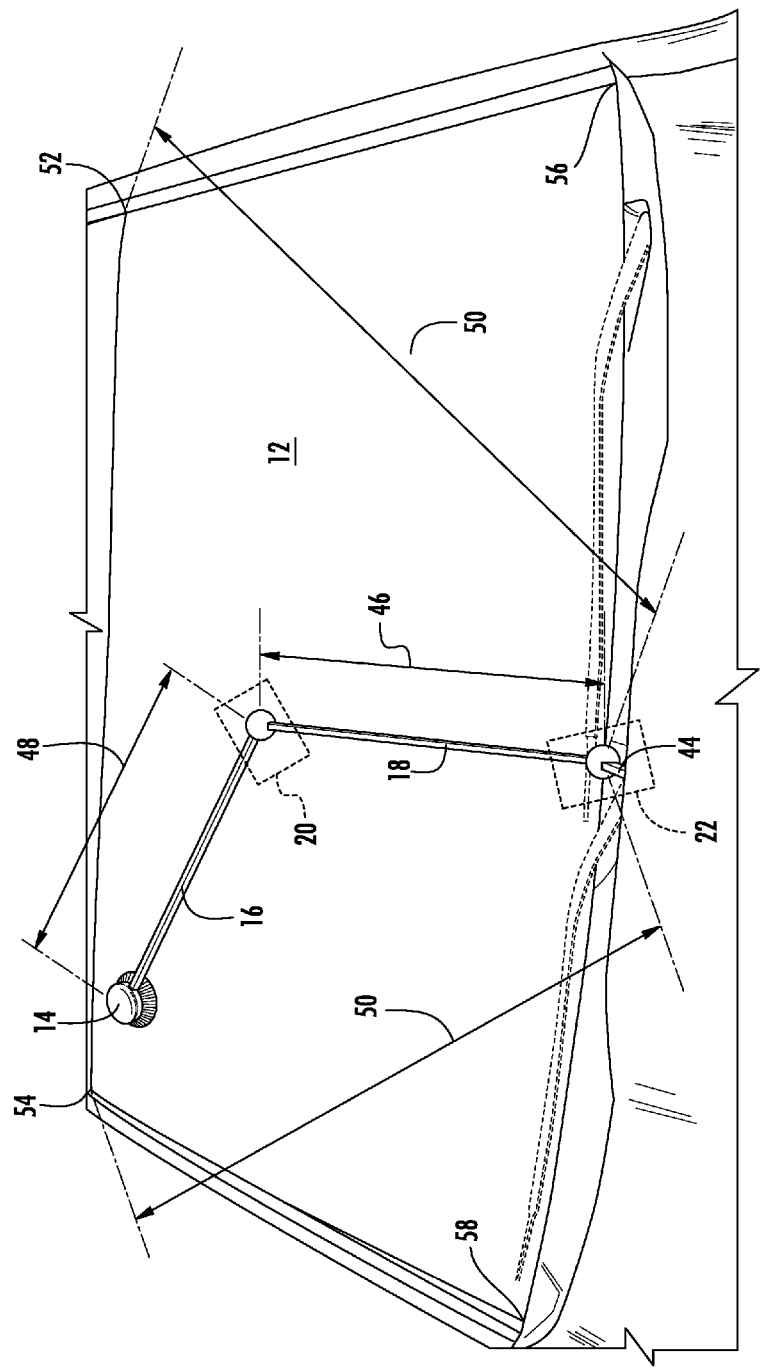
FIG. 6 is an illustration of the first embodiment of the windshield touch and clean system in the deployed configuration with the cleaning head in a different position compared to that shown in FIGS. 4 and 5.
Figure 7:
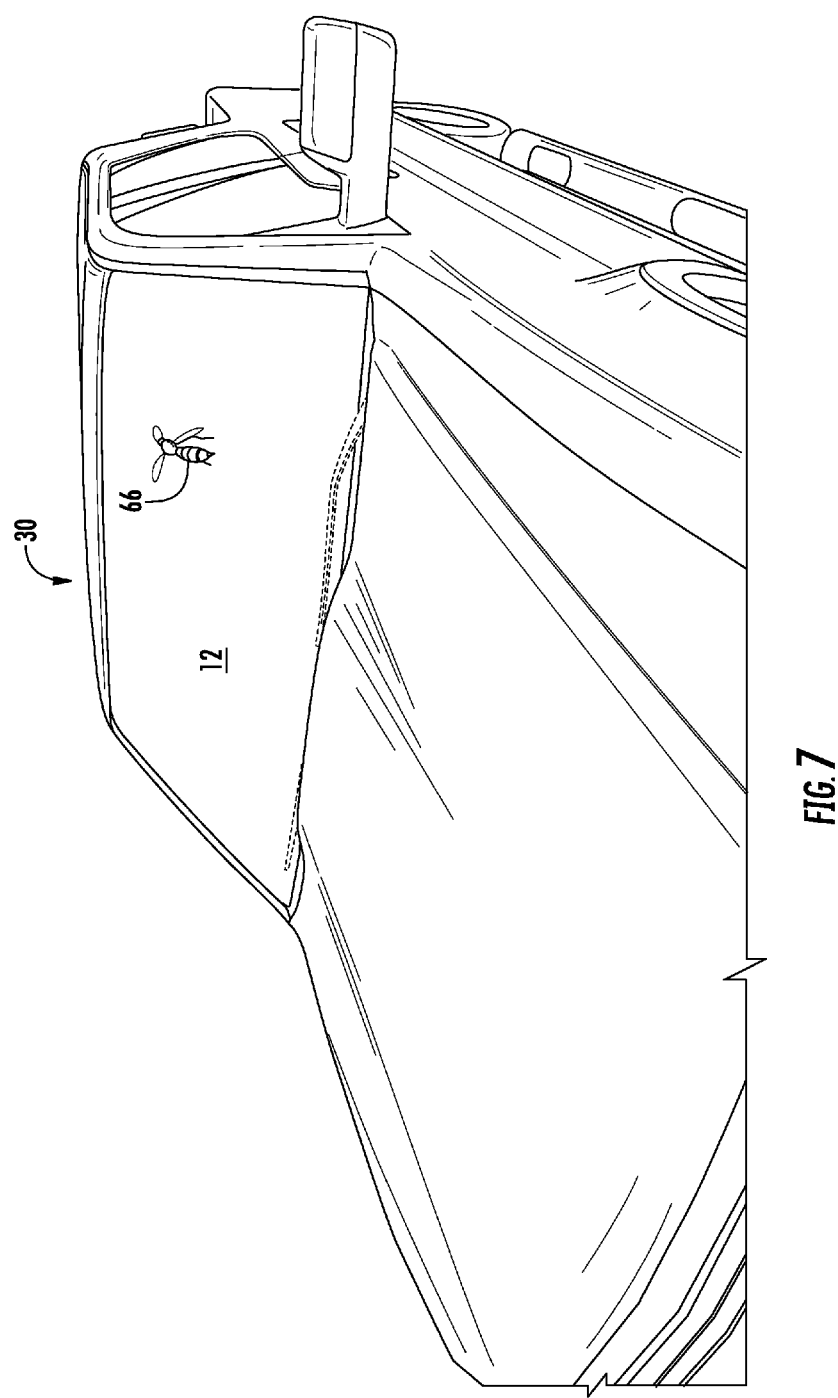
FIG. 7 illustrates a bug flying toward a windshield of an automobile.

If the driver depresses the full wash option 43 on the display 26, the windshield touch and clean system 10 begins to deploy as shown in FIG. 4. The extension members 16, 18 are raised out from under the hood 38. The extension members 16, 18 are connected to each other by way of an articulating joint 20 as shown in FIG. 5. The extension member 18 is attached to the automobile 30 by way of a base member 44. The base member 44 can also be traversed out from under the hood 38 as shown in FIG. 1 or traversed toward the windshield 12 as shown in FIG. 5. When the windshield touch and clean system 10 is tucked under the hood 38, the base member 44 is retracted under the hood 38. Also, the articulating joint 20 allows the extension members 16, 18 to be folded or made parallel with respect to each other. The extension members 16, 18 are then placed laterally and tucked under the hood 38 as shown in FIG. 1.

The articulating joints 20, 22 control movement of the extension member 18 with respect to the base member 44, and the extension member 16 with respect to the extension member 18. By having two extension members 16, 18, the entire surface area of the windshield 12 may be cleaned by the cleaning head 14. A length 46 of the extension member 18 plus a length 48 of the extension member 16 may be equal to or longer than a distance 50 from the articulating joint 22 to either of an upper driver side corner 52 or a passenger side corner 54 of the windshield 12. In this manner, when the extension members 16, 18 are linearly aligned (i.e., straight) to each other, the cleaning head 14 can reach the full extent of the windshield 12 up to the passenger side corner 54 and the driver side corner 52 of the windshield 12.

The articulating joint 22 allows the extension member 18 to rotate at least 180° so that the extension member 18 can extend horizontally toward a driver side lower corner 56 and a passenger side lower corner 58. The articulating joint 20 allows the extension member 16 to rotate at least 275° and up to 360° so that the extension member 16 can be positioned parallel on either side of the extension member 18. The extension member 18 may rotate with respect to the base member 44 and the extension member 16 may rotate with respect to the extension member 18 by way of chains and/or pulleys that are driven by a motor located under the hood 38. Alternatively, the articulating joints 20, 22 may have micro motors and gears that control the rotation of the respective extension members 16, 18 with respect to each other in the extension member 18 with respect to the base member 44.

When the user depresses the full wash option 44 on the display 26, the extension members 16, 18 are deployed out from under the hood 38. The extension members 16, 18 position the cleaning head 14 about an area on the windshield 12 to be cleaned. The cleaning head 14 cleans a small portion of the windshield 12 before it moves on to the next area of the windshield 12 to be washed. By way of example and not limitation, the windshield 12 may be divided into sections 60a-n. When the entire windshield 12 is to be washed, the cleaning head 14 may be traversed over one of the sections 60 such as section 60a. With the cleaning head 14 over the section 60a of the windshield 12, cleaning fluid may be squirted out of the cleaning head 14 on the windshield 12 at section 60a.

The cleaning head 14 may have a vibration unit that vibrates bristles 62 of the cleaning head 14 so that dirt and grime can be more effectively rubbed off of the windshield 12. As the bristles clean the windshield 12 at section 60a, the cleaning fluid drips down onto a lower section of the windshield 12. Even though the cleaning fluid drips down onto the lower section of the windshield 12, the cleaning head 14 will eventually clean that area too as the cleaning head 14 laterally cleans each section laterally from top to bottom.

The cleaning head 14 may also be paired with a rubber blade or wiper 64. In particular, the rubber wiper 64 is located under the extension member 16. The rubber wiper 64 has a generally pointed tip which contacts the windshield and is flexible so that the rubber wiper 64 can extend across a portion of section 60 that has been washed clean by the bristles 62 of the cleaning head 14 to wipe the section 60 dry by pushing the cleaning fluid to the side or downward. Alternatively, the cleaning head 14 can clean two or more sections first then the rubber wiper 64 can wipe dry two or more sections 60 at the same time. The cleaning head cleans the upper row of sections 60a, b, c-n first. Thereafter, the cleaning head 14 cleans the next lower row of sections 60 by following the procedures discussed above. It is also contemplated that the cleaning head 14 may clean all of the sections 60 of the windshield 12 first before the rubber wiper 64 wipes the windshield 12 dry.

Figure 8:
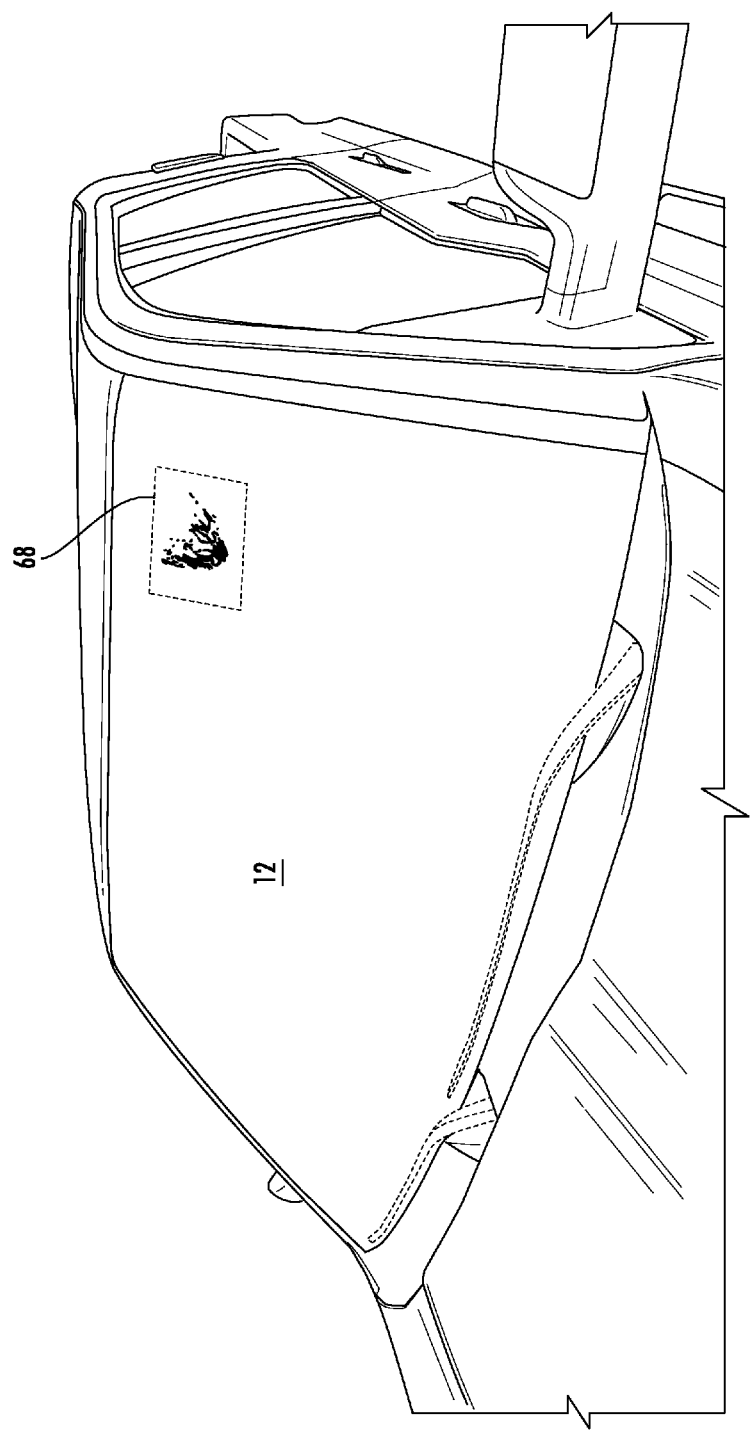
FIG. 8 illustrates the bug leaving a residue on the windshield after contacting the windshield.
Figure 9:
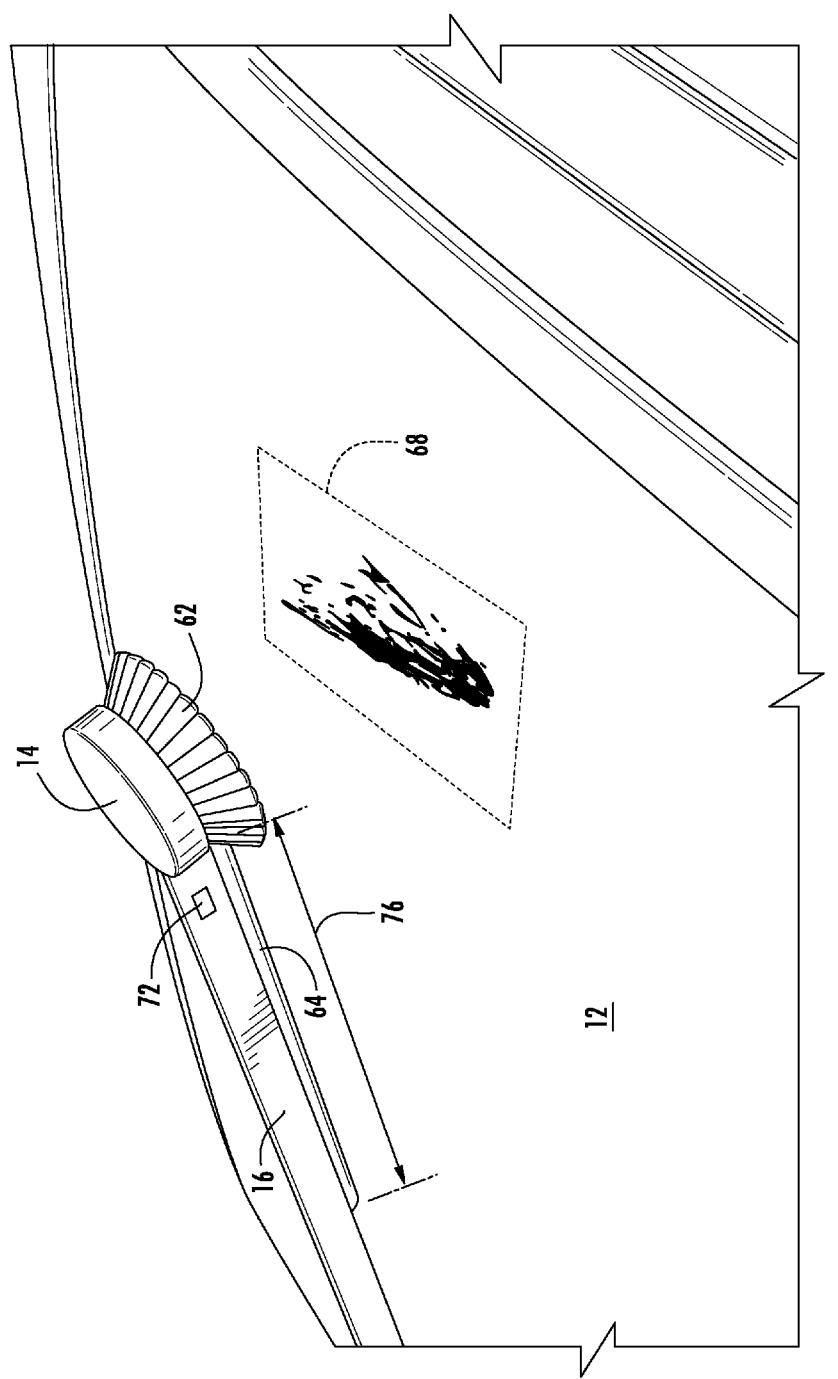
FIG. 9 illustrates the cleaning head of the first embodiment of the windshield touch and clean system positioned over the residue shown in FIG. 8.
Figure 10:
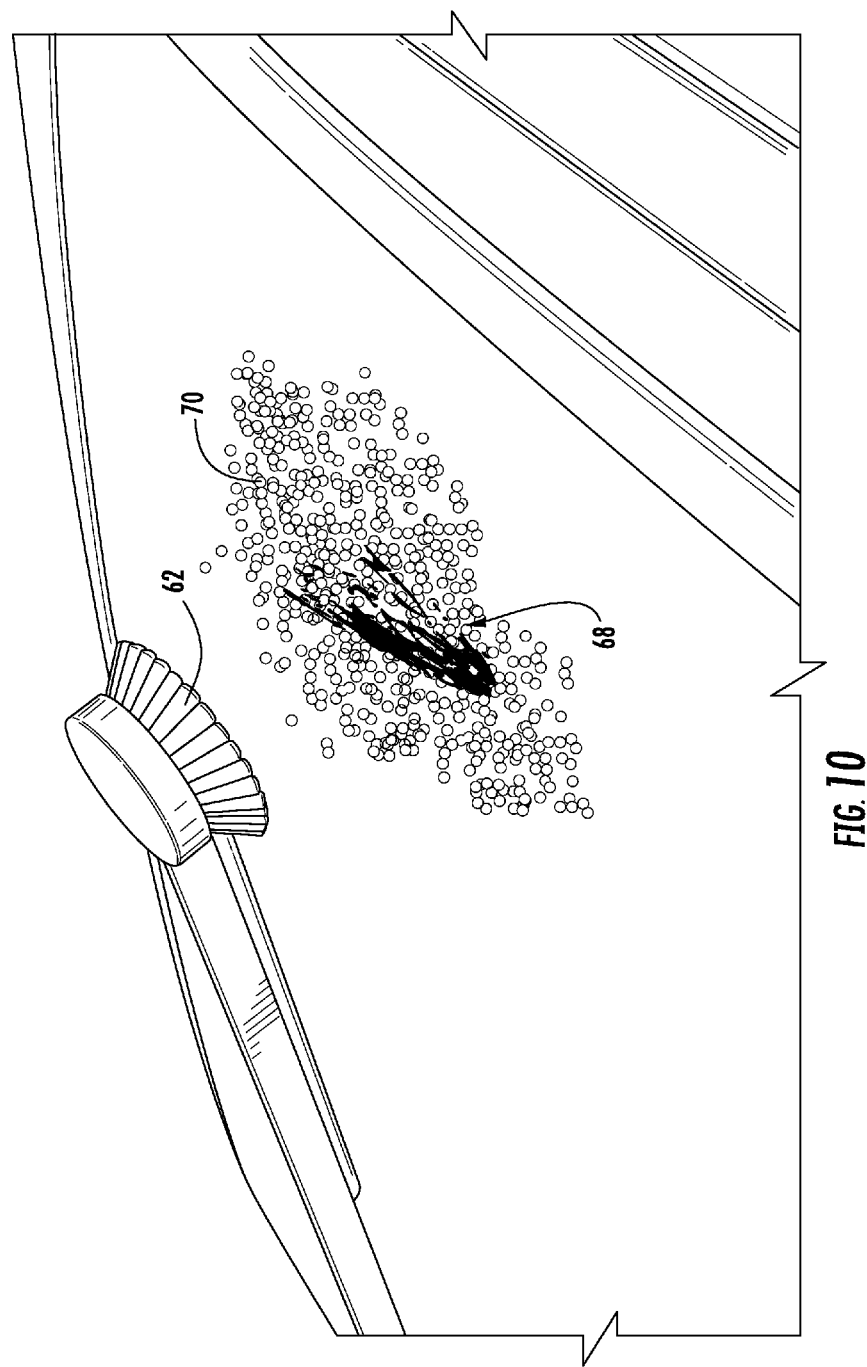
FIG. 10 illustrates cleaning fluid being sprayed on the residue via a spray nozzle mounted to the cleaning head.
Figure 11:
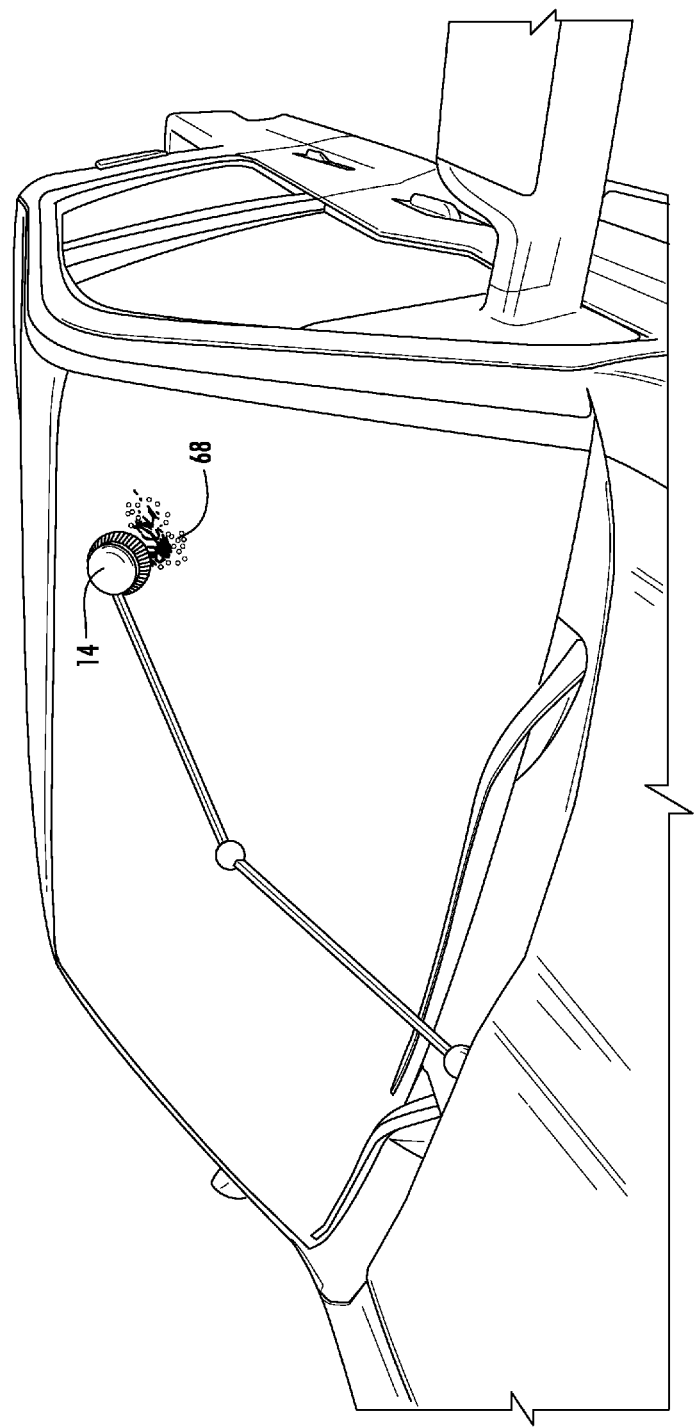
FIG. 11 illustrates the cleaning head cleaning the residue off of the windshield.

Referring now to FIGS. 7-12, the windshield touch and clean system 10 may have a spot clean feature. In this regard, the system 10 may clean a spot of dirt and grime on the windshield 12. In particular, when the automobile 30 is being driven, a bug 66 may approach the windshield 12. The bug may be killed by hitting the windshield 12, as shown in FIG. 8 and die but leave a residue 68 on the windshield 12. When the driver is driving the automobile 30, the residue 68 may visually impair the driver's vision through the windshield 12 and at the very least irritate the driver since the windshield 12 is not clean. To clean the windshield, the driver may be presented with an illustration of the windshield 12 on the display 26. The driver can depress the display 26 at about the location where the residue 68 is on the windshield 12. By depressing an area on the display 26 depicting the windshield 12, this may actuate the extension members 16, 18 and the base member 44 to move into the deployed configuration. In the deployed configuration, the extension members 16, 18 and the base member 44 move out from under the hood 38 and position the cleaning head 14 at the corresponding location on the windshield 12 where the user depressed the display 26, as shown in FIG. 9. When the cleaning head 14 is disposed over the residue 68, the cleaning head, which also has a spray nozzle 37, sprays cleaning fluid 70 on the residue 68. The cleaning head 14 is shown as being lifted above the residue 68, but this is merely for the purposes of clarification. The cleaning head 14 extends immediately above the residue 68 so that the bristles 62 contact the windshield 12. The spray nozzle for the cleaning fluid is located under the cleaning head 14 or within the outer perimeter defined by the bristles 62. A tube is routed through the extension members 16, 18 to supply the cleaning fluid to the spray nozzle.

With the cleaning head 14 disposed adjacent or on top of the residue 68, the cleaning head 14 can be traversed back and forth over the residue 68 with the motor 32 controlling the motions of the extension members 16, 18 or microcontroller in the articulating joints 20, 22. As the cleaning head 14 moves back-and-forth as shown in FIG. 12, the residue 68 is cleaned off of the windshield 12. The cleaning head 14 may be traversed back and forth but may also have other motions such a circular or oval in order to clean the residue 68 off of the windshield 12. To further facilitate cleaning of the residue 68 off of the windshield 12, the cleaning head 14 may also have a vibration unit 72 as shown in FIG. 12. The vibration unit 72 may always be on if the cleaning head 14 is in the deployed position. Alternatively, the vibration unit 72 may be on only if the user depresses the vibration option from the cabin and more particularly by depressing a vibration option icon 74 on the display 26.

The cleaning head 14 may have a plurality of bristles 62 that are formed in a round configuration. The bristles 62 may extend across the entire area defined by the outer perimeter of the bristles 62 as shown in the drawing. Alternatively, a central portion of the bristles 62 may be less dense or empty so that a spray head can protrude and spray cleaning fluid on to the windshield 12. Although the bristles 62 are shown in a round configuration, other shapes and configurations are also contemplated. By way of example and not limitation, the bristles 62 may be formed into a triangular or rectangular or square configuration. The bristles may be fabricated from a soft yet rigid material so that the distal ends of the bristles 62 may apply friction to the residue 68 to rub the residue 68 off of the windshield 12. The bristles may additionally be softer than the windshield 12 so that repeated cleaning of the windshield 12 by the cleaning head 14 does not scratch the windshield 12. By way of example and not limitation, the bristles 62 may be fabricated from a polyethylene material.

The bristles 62 are shown as being stationary or fixed to the cleaning head 14. However, it is also contemplated that the bristles 62 may rotate in a clockwise direction, counterclockwise direction or alternate between clockwise and counterclockwise directions. A motor may be mounted within the cleaning head 14 to accomplish the rotational movement of the bristles 62. Electrical wiring may be routed to the cleaning head 14 through the extension members 16, 18 to the computer 24.

The vibration unit 72 may be mounted within the cleaning head 14 but may also be mounted near the cleaning head 14 on the extension member 16. Regardless of where the vibration unit 72 is located, the vibration unit 72 is operative to vibrate the bristles 62 to increase the cleaning action of the bristles 62 on the residue 68. The vibration unit 72, as discussed above, may have multiple modes of operation. In a first mode of operation, the vibration unit 72 may be activated and turned on only when the windshield wiper system 10 is in the deployed configuration, namely, when the cleaning head 14 is extended out from under the hood 38 and over the windshield 12. In a second mode of operation, the vibration unit 72 may be activated and turned on only after a spray nozzle located on the cleaning head 14 squirts cleaning fluid on to the windshield 12. In a third mode of operation, the vibration unit 72 may be activated and turned on only upon depression of the vibration icon 74 on the display 26. In this matter, the driver or user can dictate when the vibration unit 72 is turned on and activated.

The rubber wiper 64 may be disposed immediately under the extension member 16, as shown in FIG. 9. The rubber wiper 64 may extend downward from the extension member 16 and be positioned so that a central plane that bisects the rubber wiper 64 is generally perpendicular to the windshield wiper 12. The rubber wiper 64 may be generally flexible so that as the rubber wiper 64 squeegees the residue 68 and the cleaning fluid off of the windshield 12, the rubber wiper 64 may bend in an opposite direction compared to the direction of travel of the rubber wiper 64. A length 76 of the rubber wiper 64 may be about 4 to 6 inches and up to 18 inches long. The rubber wiper 64 is operative to wipe the residue 68 and the cleaning fluid off of the windshield 12 by causing the rubber wiper 64 to be traversed over the windshield 12 in a sweeping motion similar to a squeegee.

Figure 14:
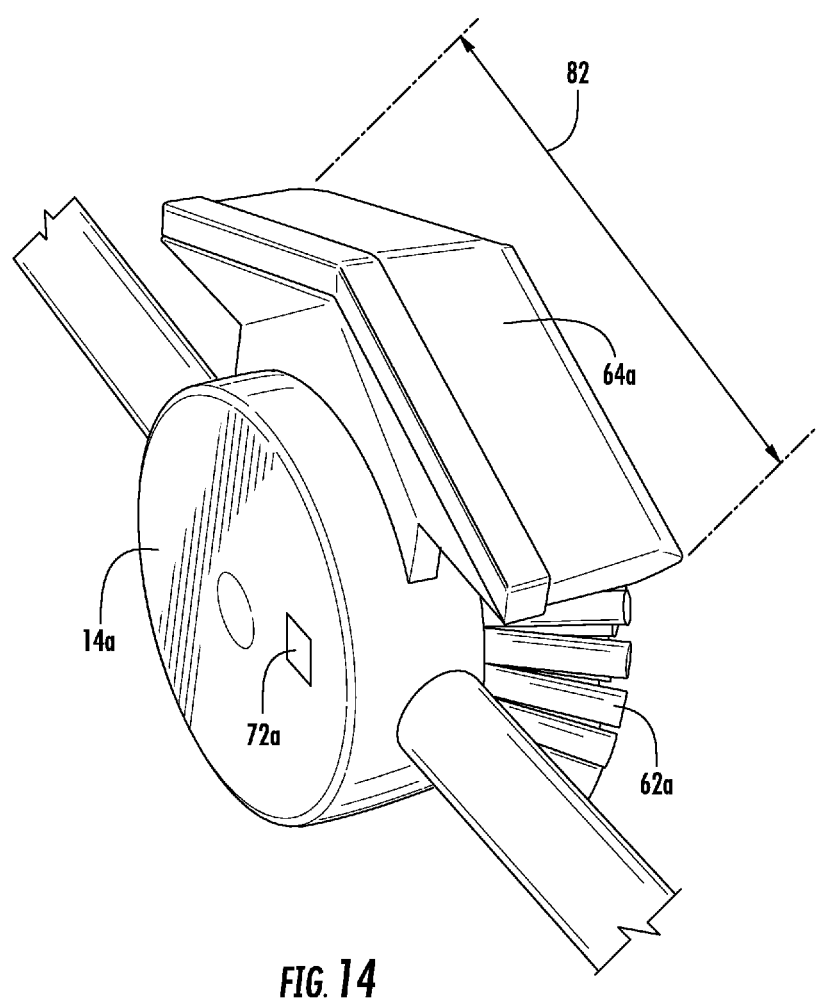
FIG. 14 illustrates the cleaning head of the second embodiment of the windshield touch and clean system as shown in FIG. 13.

Referring now to FIGS. 13 and 14, a second embodiment of the windshield touch and clean system 10*a* is shown. Instead of the cleaning head 14*a* being controlled by two extension members 16, 18, the cleaning head 14*a* is controlled by an X-Y gantry system. The left and right sides of the windshield 12 may have left and right tracks. These tracks 76, 78 receive a horizontal member 80, and more particularly, opposed end portions of the horizontal member 80. The tracks are operative to lift the horizontal member 80 up and down the tracks 76, 78 on the windshield 12. By way of example and not limitation, the left and right tracks 76, 78 may be retrofitted with a linear micro motor that lifts the horizontal member 80 up and down the tracks 76, 80. When the windshield wiper system 10*a* is traversed to a stored position, the tracks extend downward below the hood 38 so that the horizontal member 80 and the cleaning head 14*a* can be tucked under the hood and out of sight.

If the left and right tracks 76, 78 are parallel to each other, then the horizontal member may have a fixed width 82. However, if the left and right tracks 76, 78 are skewed with respect to each other. For example, the upper side of the tracks 76, 78 are closer to each other or have a smaller width 82 compared to a lower side of the tracks 76, 78. In this case, the horizontal member 80 may have an adjustable width 82. The adjustment in the width 82 of the horizontal member 80 may come in the form of a telescoping rod on the passenger side of the horizontal member 80. It is also contemplated that the telescoping feature of the horizontal member 80 may be formed on the driver side of the horizontal member 80. The cleaning head 14*a* may be traversed left and right along the horizontal member 80 so that the cleaning head 14*a* can reach the entire surface area of the windshield 12 for cleaning.

The windshield touch and clean system 10*a* may operate in the same fashion as that of the windshield touch and clean system 10 except that the cleaning head 14*a* is traversed over the windshield 10 with the gantry system instead of two extension members 16, 18 connected with articulating joints 20, 22. Moreover, the rubber wiper 64*a* has an arrow configuration compared to the straight linear configuration shown in respect to the windshield touch and clean system 10. The rubber wiper 64*a* is also disposed above the bristles 62*a* of the cleaning head 14*a*. Preferably a width 82 of the rubber wiper 64*a* is about as wide as a diameter of the bristles 62*a*. Also, the width 82 may be about 4 to 12 inches wide.

The horizontal member 80 may be a bar with telescoping portions on either the passenger side with the driver side when the tracks 76, 78 are skewed with respect to each other. If the tracks and 76, 78 are parallel with respect to each other, then the horizontal member 80 may be a fixed length. However, it is also contemplated that the horizontal member 80 may be a belt driven structure. The belt driven structure comprises of a circular belt that runs on pulleys. The pulleys may be located adjacent the tracks 76, 78 and be operative to be traversed up and down the tracks 76, 78. The cleaning head 14*a* is fixedly attached to the belt. In order to traverse the cleaning head 14*a* in the left and right directions, the pulleys are rotated to move the belt, and thus the cleaning head 14*a* in the left and right directions.

As used herein, the term automobile includes any mechanical transportation mechanism including but not limited to a passenger vehicle, truck, motor home and airplane.

The above description is given by way of example, and not limitation. Given the above disclosure, one skilled in the art could devise variations that are within the scope and spirit of the invention disclosed herein, including various ways of attaching the bristles 62 to a base of the cleaning head. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An automobile having a windshield touch and clean system for spot cleaning a windshield of the automobile, the automobile comprising:
    a plurality of wheels;
    an engine connected to the plurality of wheels for propelling the automobile forward;
    a steering wheel connected to at least one of the plurality of wheels for guiding a direction of the automobile;
    the windshield for protecting a driver of the automobile from projectiles;
    the windshield touch and clean system positioned outside of the automobile below the windshield, the windshield touch and clean system having:
        a cleaning head for washing dirt off of the windshield, the head being connected to the automobile with an articulating joint system or a gantry system so that the head is positionable at a location within a primary field of view of the windshield, wherein in the articulating joint system, a first extension member is connected to the head, a second extension member is pivotally connected to the first extension member and the second extension member is pivotally connected to the automobile;
        a touch screen adjacent to the automobile, the touch screen displaying a visual depiction of the windshield and the touch screen being connected to a computer which controls the articulating joint system or the gantry system to position the head.

2. The automobile of claim 1 wherein the head has a brush.

3. The automobile of claim 1 wherein the head has a vibration unit for vibrating the head while cleaning dirt off of the windshield.

4. The automobile of claim 1 wherein in the articulating joint system, the head or the first extension member has a spray nozzle for spraying cleaning fluid on the windshield.

5. The automobile of claim 1 wherein the a computer is mounted to the automobile.

6. The automobile of claim 5 wherein the computer positions the cleaning head to spot clean an area on the windshield of the automobile.

7. The automobile of claim 1 further comprising a motor for controlling the first and second extension members and the position of the head on the windshield in the articulating joint system.

8. The automobile of claim 1 further comprising a tube for routing cleaning fluid toward the cleaning head and fluidically connected to a spray nozzle disposed on or adjacent to the cleaning head.

9. The automobile of claim 1 wherein the gantry system comprises:
- passenger side and driver side rails located on driver and passenger sides of the windshield of the automobile;
- a horizontal member attached to the passenger side and driver side rails for controlling a vertical position of the horizontal member;
- the cleaning head attached to the horizontal member;
- wherein the horizontal member is manipulated with respect to the passenger side and driver side rails to vertically position the cleaning head and the cleaning head is traversable along a length of the horizontal member to horizontally position the cleaning head and pinpoint the cleaning head on the windshield of the automobile.

10. The automobile of claim 9 wherein the passenger side and driver side rails are tracks.

11. The automobile of claim 9 wherein the passenger side and driver side rails are parallel to each other.

12. The automobile of claim 9 wherein the passenger side and driver side rails are skewed with respect to each other and the horizontal member is adjustable in length.

13. The automobile of claim 1 wherein the touch screen receives a touch of a user's finger and the computer positions the cleaning head to spot clean an area associated to a location of the sensed touch on the touch screen.

14. An automobile having a windshield touch and clean system for spot cleaning a windshield of the automobile, the automobile comprising:
- a plurality of wheels;
- an engine connected to the plurality of wheels for propelling the automobile forward;
- a steering wheel connected to at least one of the plurality of wheels for guiding a direction of the automobile;
- the windshield for protecting a driver of the automobile from projectiles;
- the windshield touch and clean system positioned outside of the automobile below the windshield, the windshield touch and clean system having:
  - a cleaning head for washing dirt off of the windshield, the head being connected to the automobile with an articulating joint system or a gantry system so that the head is positionable at a location within a primary field of view of the windshield;
- a touch screen adjacent to the automobile, the touch screen displaying a visual depiction of the windshield and the touch screen being connected to a computer which controls the articulating joint system or the gantry system to position the head.

15. The automobile of claim 14 wherein the touch screen receives a touch of a user's finger and the computer positions the cleaning head to spot clean an area associated to a location of the sensed touch on the touch screen.

* * * * *